United States Patent Office 3,564,003
Patented Feb. 16, 1971

3,564,003
2,2'-BIS(HEPTAFLUOROPROPYL)-
5,5'-BIBENZOXAZOLE
Charles D. Burton and Norman L. Madison, Midland, Mich., assignors to The Dow Chemical Company, Midland, Mich., a corporation of Delaware
No Drawing. Filed Feb. 5, 1968, Ser. No. 702,777
Int. Cl. C07d 85/48
U.S. Cl. 260—307　　　　　　　　　　　4 Claims

ABSTRACT OF THE DISCLOSURE

A novel compound 2,2' - bis(heptafluoropropyl)-5,5'-bibenzoxazole and the manner of its preparation. The compound is prepared by reacting 3,3'-diaminobiphenol in a solvent or carrier liquid with methylperfluorobutyrimidate in the presence of an aliphatic carboxylic acid as reaction promoter. Alternatively, the compound can be prepared by heating 3,3'-bis(heptafluorobutyramido)-4,4'-dihydroxybiphenyl in the presence of a dehydrating agent to effect cyclization. The present novel compound is suitable for use as an antiplasticizer.

BACKGROUND OF THE INVENTION

Certain types of compounds when added to polymers produce therein an increase in the modulus and tensile strength and a decrease in the elongation, for example, in films produced thereof. This effect is known as antiplasticization since just the opposite results, i.e., decreased modulus and tensile strength and increased elongation are obtained on plasticization.

It has been shown by Jackson et al., Journal of Applied Polymer Science, vol. II, pp. 211–216 (1967), that additives which are suitable for use as antiplasticizers for polymers are those compounds which are compatible with the polymer and which (a) contain polar atoms such as halogen, nitrogen, oxygen or sulfur, (b) contain at least two nonbridged rings, (c) have a glass transition temperature greater than about minus 50° C. and (d) have one dimension less than about 5.5 A. in at least 65% of the length of the molecules.

It is a principal object of the present invention to provide a novel compound which is particularly suitable for use as an antiplasticizer in polymers and which exhibits good thermal stability.

This and other objects and advantages readily will become apparent from the detailed description presented hereinafter.

SUMMARY OF THE INVENTION

The present invention is to a new and useful compound 2,2' - bis(heptafluoropropyl) - 5,5' - bibenzoxazole corresponding to the formula

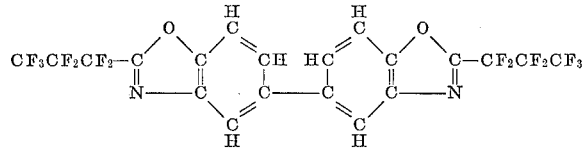

This compound ordinarily is prepared by reacting 3,3'-diaminobiphenol with methyl perfluorobutyrimidate in a solvent or carrier liquid in the presence of an aliphatic carboxylic or halogenated aliphatic carboxylic acid having from 1 to about 6 carbon atoms, and preferably from 1 to about 4 carbon atoms, as a reaction promoter. The product is separated and recovered from the reaction mixture, dried and ordinarily purified by recrystallization. The 2,2'-bis(heptafluoropropyl)-5,5'-bibenzoxazole is a white crystalline solid melting at from about 94.5–95.1° C.

Alternatively, 3,3' - bis(heptafluorobutyramido)-4,4'-dihydroxybiphenyl can be heated in the presence of a dehydrating agent, e.g., phosphorus pentoxide or polyphosphoric acid, to effect dehydration and cyclization thereby to prepare the novel compound of the present invention.

DESCRIPTION OF THE PREFERRED EMBODIMENT

In one preferred embodiment of the invention usually about equivalent quantities of the diaminobiphenyl and methyl perfluorobutyrimidate reactants in the presence of acetic, perfluoroacetic or perfluorobutyric acid as a reaction promoter are reacted with stirring in the presence of a solvent or carrier liquid at a temperature af about room temperature to about 100° C. usually at from about 40 to about 90° C. for a period of from about 2 to about 72 hours, ordinarily from about 4 to about 8 hours.

The 2,2'-bis(heptafluropropyl) - 5,5' - bibenzoxazole is separated from the reaction mixture, generally after removing a portion of the solvent or carrier, by filtering, centrifuging or other liquid-solid separatory procedures. The so-recovered product usually is washed and dried. For optimum in purity, it can be recrystallized from a suitable solvent system. The crystalline product as first prepared usually is yellow to brown in color. Upon subsequent recrystallization, a high purity white crystalline product in platelike form is obtained.

Although stoichiometric quantities of reactants usually are employed in the preparation of the compound, the methyl perfluorobutyrimidate can be employed in greater than stoichiometric amounts without detrimentally affecting the reaction or product formation. In any event, the aliphatic carboxylic acid reaction promoter at a minimum should be present in a molar quantity equal to that of the methyl perfluorobutyrimidate. The acid reaction promoter can be present in excess of this amount, in fact, if desired this material also can serve as a solvent or carrier for the reactants used in the process.

Solvents or carrier liquids suitable for use in preparing the present novel compound can be selected from any of a wide variety of liquids including, for example, (1) organic polar aprotic materials such as aliphatic ethers exemplified by diethylene glycol dimethyl ether, ethylene glycol dimethyl ether, dioxane, (2) polar protic solvents such as the fluorinated alcohols, e.g., hexafluoroisopropanol, (3) halogenated hydrocarbons such as carbon tetrachloride, chloroform, methylene chloride and the like. The selection of a given liquid is not critical so long as it exhibits a solubility for at least a portion of the reactants and is inert to or does not detrimentally react with the reactants and product compound.

The quantity of solvent or carrier to be employed is not critical. Excessively large volumes of solvent are not desired since these entail the use of large reactors and material handling transport equipment and systems.

Generally an inert atmosphere, e.g., substantially anhydrous nitrogen, is employed in the preparation of the compound. This assures optimum in purity and product yield.

Alternatively, 3,3'-diaminobiphenol can be reacted with perfluorobutyryl chloride in the presence of a solvent or carrier to provide the corresponding 3,3'-bis(perfluorobutyramido)-4,4'-dihydroxybiphenyl. Heating this material in the presence of a dehydrating agent, e.g., polyphosphoric acid, in an inert atmosphere at a temperature sufficient to effect dehydration gives the corresponding 2,2' - bis(heptafluoropropyl)-5,5'-bibenzoxazole. Usually temperatures of from about 100 to about 300° C., ordinarily about 200° C., and heating times of at least several hours, ordinarily from about 2 to about 72 hours or more are used.

The following examples will serve to further illustrate the present invention but are not meant to limit it thereto.

EXAMPLE 1

About 10.5 grams (0.049 gram mole) of 3,3'-diaminobiphenol in 200 milliliters of dioxane was charged to a 500 milliliter, 3-neck flask equipped with a stirrer, addition tube and reflux condenser. A mixture of perfluorobutyric acid, 21.5 grams (0.100 gram mole) and methyl perfluorobutyrimidate, 22.8 grams (0.100 gram mole) was added dropwise with stirring to this solution.

The reaction mass was heated under a nitrogen atmosphere at about 80° C. for about 5½ hours. The external heating was stopped after this time. Soon after the initiation of the external heat, all of the solids went into solution.

The reaction mixture was stirred overnight (~18 hours) at room temperature under a nitrogen atmosphere. Following this period, the condenser was replaced with a still head and about 100 milliliters of liquid removed from the reactor. This proved to be dioxane. The reactor was cooled to 20° C. whereupon a solid product precipitated therein. This was removed by filtration; this solid product was washed with a small amount of water and dried under a low absolute pressure at about 50° C. for two hours. The resulting product was a light yellow material and about 9.35 grams was obtained.

The filtrate from the reaction mixture was poured into 300 milliliters of deionized water. A precipitate formed. This was separated by filtering, washed with water and dried at a low absolute pressure at 50° C. for two hours. The resulting dark brown solid product weighed 14.51 grams, giving a total weight of crude product of 23.86 grams, indicating a product yield of about 86% of theoretical. The infrared spectra of the two materials were essentially the same and showed no C=O, OH or N—H groupings.

The crude product was dissolved in boiling benzene and separated from a small amount of benzene insoluble tar. The benzene was evaporated from the filtrate and the resulting solid product was recrystallized from methanol using Norit charcoal as a decolorizer. The recrystallized product was redissolved in acetone, filtered to remove traces of charcoal and a white crystal product recovered by evaporation of the acetone. The white crystalline product had a melting point of 94.5–95.1° C.

Chemical elemental analysis gave C–41.6%; H–1.04%; F–46.4%; N–4.84%; O–6.12% (by difference).

Theoretical calculated analysis for 2,2'-bis(heptafluoropropyl)-5,5'-bibenzoxazole is C–41.9%; H–1.04%; F–46.5%; N–4.89%; O–5.65%.

The infrared spectrum and nuclear magnetic resonance data supported the assigned structure.

Further, on the basis of calculated bond lengths, this compound exhibits one dimension less than about 5.5 A.

Incorporating this compound at a concentration up to about 30 percent into a fluorinated polymer serves to increase the modulus and tensile strength of films prepared from such a polymer as well as to decrease the elongation of the material. This indicates that the compound is suitable for use as an antiplasticizer in polymers.

In a manner similar to that described for the foregoing example, 3,3'-diaminobiphenol and methyl perfluorobutyrimidate upon reaction in perfluoroisopropanol in the presence of acetic acid or perfluoroacetic acid as a reaction promoter yields 2,2'-bis(heptafluoropropyl)-5,5'-bibenzoxazole.

EXAMPLE 2

About 2.05 grams of 3,3'-diaminobiphenol in 25 milliliters of pyridine were charged to a 50-milliliter flask equipped with an adapter containing a stopcock. The flask and its contents was cooled to about minus 196° C. and the flask evacuated to an absolute pressure of less than 10 microns mercury. Perfluorobutyryl chloride, 4.6 grams, was measured by expansion into the vacuum line and condensed into the cold reaction flask. The flask was closed and allowed to warm to room temperature overnight. A dark colored slurry resulted; this was stirred for two hours and poured into 150 milliliters of deionized water. The resulting solid product was separated by filtration, washed with water and vacuum dried at about 50° C.

About 5.28 grams of a light tan powder were obtained. This melted at 256–258° C. Infrared and nuclear magnetic resonance analyses verified that the product was 3,3'-bis(heptafluorobutyramido) - 4,4'-dihydroxybiphenyl having only trace amounts of impurities associated therewith. The yield was about 91% of theoretical.

About 5 grams of the compound and about 10 grams of commercial polyphosphoric acid were charged to a horizontal sublimer and the mixture heated under a nitrogen atmosphere at about 200° C. for about 18 hours. This amount of polyphosphoric acid is in excess of that required for dehydration of the 3,3'-bis(heptafluorobutyramido)-4,4'-dihydroxybiphenyl.

A yellow solid product sublimed from the reaction mixture and collected in the cooling chamber of the sublimer over this period and the polyphosphoric acid turned black.

About 3.4 grams of product were recovered. Purification by crystallization gave white crystals which upon analysis and a comparison of melting points and other properties with the product obtained in Example 1 proved to be 2,2' - bis(heptafluoropropyl) - 5,5'-bibenzoxazole. The product yield was about 72%.

Various modifications can be made in the present invention without departing from the spirit or scope thereof for it is understood that we limit ourselves only as defined in the appended claims.

We claim:

1. A process for preparing 2,2'-bis(heptafluoropropyl)-5,5'-bibenzoxazole which comprises;
    (a) reacting in a solvent at a maximum temperature of about 100° C. for a period of from about 2 to about 72 hours 3,3'-diaminobiphenol and methyl perfluorobutyrimidate in the presence of an acetic acid, perfluoroacetic acid and perfluorobutyric acid,
    (b) separating said 2,2'-bis(heptafluoropropyl)-5,5'-bibenzoxazole from the reaction mass, and
    (c) recovering said 2,2'-bis(heptafluoropropyl)-5,5'-bibenzoxazole.

2. The process as defined in claim 1 wherein said 3,3'-diaminobiphenol and methyl perfluorobutyrimidate are employed in about stoichiometric quantities as required for preparation of said 2,2'-bis(heptafluoropropyl)-5,5'-bibenzoxazole and said acid reaction promoter is present at a minimum in a molar quantity equal to that of said methyl perfluorobutyrimidate.

3. The process as defined in claim 1 wherein the reaction is carried out at a temperature of from about 40 to about 90° C. for a period of from about 4 to about 8 hours.

4. The process as defined in claim 1 wherein an inert atmosphere is employed.

References Cited

FOREIGN PATENTS 1,087,779  10/1967  Great Gritain.

OTHER REFERENCES

Gitina et al.: Chem. Abstr. 66, 10869b (1967), Abstract of Voysokomolekul, Soedin, 8 (9) 1535–8 (1966).

Elderfield: Vol. 5 of "Heterocyclic Compounds," Wiley, 1957, p. 420.

ALEX MAZEL, Primary Examiner

R. V. RUSH, Assistant Examiner

U.S. Cl. X.R.

260—30.4

PO-1050
(5/69)

UNITED STATES PATENT OFFICE
CERTIFICATE OF CORRECTION

Patent No. 3,564,003            Dated 16 February 1971

Inventor(s) Charles D. Burton and Norman L. Madison

It is certified that error appears in the above-identified patent and that said Letters Patent are hereby corrected as shown below:

In column 4, line 63, insert the following after the word "an" and before the word "acetic":

-- aliphatic carboxylic acid reaction promoter, said reaction promoter being a member selected from the group consisting of --

Signed and sealed this 22nd day of June 1971.

(SEAL)
Attest:

EDWARD M. FLETCHER, JR.          WILLIAM E. SCHUYLER,
Attesting Officer                  Commissioner of Paten

PO-1050
(5/69)

UNITED STATES PATENT OFFICE
CERTIFICATE OF CORRECTION

Patent No. 3,564,003          Dated 16 February 1971

Inventor(s) Charles D. Burton and Norman L. Madison

It is certified that error appears in the above-identified patent and that said Letters Patent are hereby corrected as shown below:

At page 1 after the phrase "Background of the Invention" insert the legend:

The invention herein described was made in the course of or under a contract or subcontract thereunder with the Department of the Air Force.

Signed and sealed this 26th day of October 1971.

(SEAL)
Attest:

EDWARD M. FLETCHER, JR.      ROBERT GOTTSCHALK
Attesting Officer               Acting Commissioner of Patents